July 2, 1968 R. J. FORTUNE 3,390,424
APPARATUS FOR PELLETIZING FINELY DIVIDED SOLIDS
Filed Oct. 6, 1966
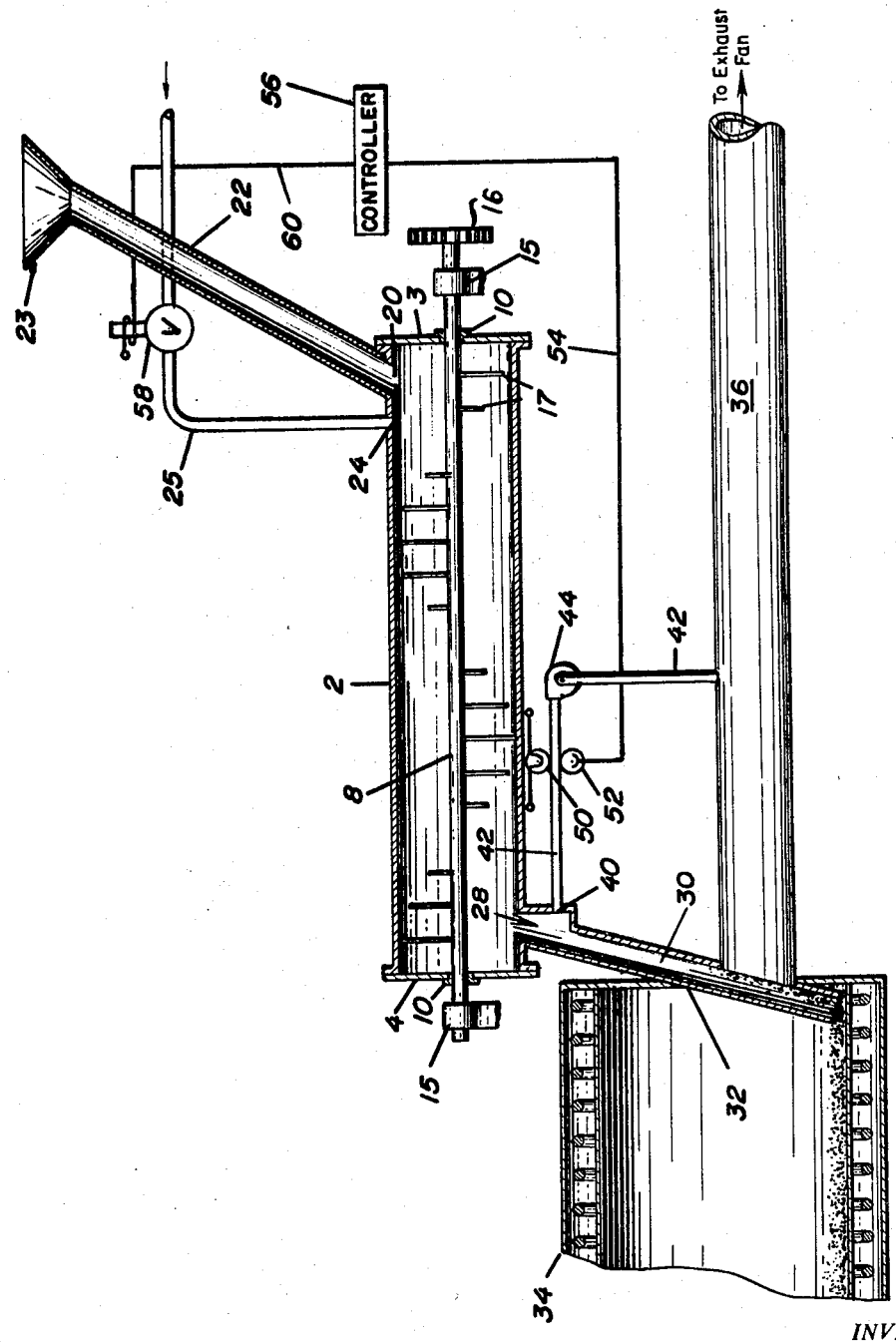
INVENTOR.
Reginald J. Fortune
BY
L. David Trapnell
ATTORNEYS United States Patent Office 3,390,424
Patented July 2, 1968

3,390,424
APPARATUS FOR PELLETIZING FINELY DIVIDED SOLIDS
Reginald J. Fortune, Oklahoma City, Okla. assignor to Continental Carbon Company, a corporation of Delaware
Filed Oct. 6, 1966, Ser. No. 584,897
5 Claims. (Cl. 18—1)

The present invention relates to the pelletizing of finely divided solids with liquids and particularly to apparatus for converting finely divided solids to pelleted agglomerates by the agitation of a mixture of finely divided solids and liquid in a substantially closed drum or mixing box, such as used in pelletizing carbon black, and in the improved apparatus for accomplishing the same disclosed herein.

At the present time only a small portion of the carbon black manufactured is marketed as a fluffy, compressed material; and, the vast majority of carbon black is marketed in pelletized form, principally because the pelletized black is higher in density, much cleaner and less dusty to handle, and can be transferred to and from bulk storage and transportation equipment with greater facility.

There are two basic systems for pelletizing carbon black that are utilized in the carbon black industry at the present time.

The older dry pelletizing process involves the agitation of dry, loose carbon black in large drums in the presence of seed pellets for extended periods of time in the order of two to sixteen hours until a dry pelletized product is formed, said process being difficult to operate and maintain while providing rather poor results in terms of product.

The newer wet pelletizing process involves mixing loose carbon black with a substantial ratio of water for rather vigorous agitation for relatively short periods of time to convert the mixture to the form of wet pellets. The agitation is usually accomplished by a continuous flow process in a cylindrical chamber with a pin-shaft type agitator rotating within said chamber. The cylindrical chamber is stationary, of relatively small volume, and horizontally disposed. The loose carbon black is fed separately into the inlet end of the cylindrical chamber or pelletizing box, and water is introduced concurrently in the same area of the box. The agitation of the carbon black and water converts the loose black to agglomerated pellets, and the wet pellets are continuously discharged from the opposite end of said chamber for movement normally by gravity into drying drum apparatus for removal of water, such as into a rotating drying drum.

The wet pelletizing process, normally utilizing water as the basic pelletizing liquid, is preferred over the older, dry pelletizing method; however, the wet process remains a source of problems to carbon black manufacturers and leaves much to be desired.

In the overall process scheme for the manufacture of carbon black, the effluent from the reaction chamber or furnace is comprised of the flocculent carbon black and combustion gases so the carbon black must be separated as a product. The carbon black and effluent gas is passed into a separation and collection means to remove the carbon black which is conveyed to the pelletizing operation. The carbon black is actually converted to a finished product by pelletizing the same to eliminate the finely divided solids by replacement with pellets of carbon black, said pelletizing being accomplished in most instances by the wet process and thereafter passing the wet pellets through a drying drum for water removal and finishing, thence to storage for shipment.

One of the most important factors in controlling the pelletizing of the carbon black and the quality of the wet pellets produced by a pelletizing mixing box of the type described is accurate control of the critical ratio of the carbon black and the water or other wetting agent. The degree of agitation can be controlled somewhat by monitoring the speed of revolution of the agitator shaft and pins; however, this control aspect is not used frequently in view of the criticality of the black and water ratio.

Heretofore control of the black and water ratio has, for the most part, depended upon the visual examination of the process and operation and the mechanical skill of an operator based on experience in the operation of the pelletizing-mixing vessel. Accordingly, the consistent quality control and uniformity of the wet pellets has been difficult to achieve.

It is among the objects of the present invention to produce by the wet pelleting process pellets of the type described which are consistently of the highest quality and desired uniformity.

Another object of the present invention is the attainment of the immediately foregoing objective by accurate and automatic control of the ratio between the carbon black and the water or other wetting agent.

Other objects and advantages of the invention will be apparent from the following description of the preferred embodiment taken in conjunction with the following description wherein like reference numerals designate like parts.

In the drawing, the sole FIGURE 1 is a layout representing one form of the apparatus which may satisfactorily be employed to practice the teachings of the present invention.

Broadly stated, the present invention may be defined as an apparatus for pelletizing finely divided solids comprising a stationary elongate cylindrical vessel having means for introducing an input of finely divided solids into the interior of said vessel and means for introducing an input of liquid into the interior of said vessel, together with means within said vessel for the agitation of the mixture of said solids and liquid, including means for removing from said vessel the pellets of said mixture formed therein together with the dust accompanying the same and means for controlling at least one of the inputs to said vessel in accordance with the dust level in the removing means.

Referring more particularly to the drawing, the numeral 2 generally designates the housing of the pelletizing vessel or mixing box, the same comprising a horizontally disposed stationary cylindrical vessel which is closed at both ends by closure plates indicated at 3 and 4.

A rotatable shaft 8 extends longitudinally through the center of the housing 2, with its ends protruding through packing glands 10 which are carried by the aforementioned end closure plates 3 and 4.

The terminal portions of the rotatable shaft 8 are supported by bearings 15. One of the ends of the shaft 8 extends through the corresponding bearing and is appropriately connected to a suitable drive means not shown except as to gear 16. Within the housing 2, the entire length of the rotatable shaft 8 is provided with a plurality of radially projecting agitator pins 17. These radially projecting agitator pins 17 are rigidly mounted at uniformly spaced distances, both longitudinally and angularly, so as to form a suitable pattern along said shaft, such as a multiflight, helical row. There can be included within said box a vane means affixed to said shaft 8 to assist in moving the carbon black through the cylindrical housing.

Adjacent end closure plate 3, the horizontally disposed stationary cylindrical housing 2 is shown as provided on its upper side with an inlet opening 20 which communicates with an upwardly extending inlet chute 22, the upper end of the latter chute terminating in a hopper 23, wherein the flocculent carbon black to be wet pelletized is maintained and stored prior to pelletizing.

Slightly downstream of the inlet opening 20, the cylindrical housing 2 is provided, preferably on its upper side, with at least one liquid spray port 24 which is connected to a line 25 for the pelletizing liquid, such as water, which is in communication with a liquid supply not shown.

Adjacent the other end closure plate 4, the horizontally disposed stationary cylindrical housing 2 is provided on its underside with a discharge opening 28 which communicates with a downwardly extending outlet or discharge chute 30, the lower end of which communicates with a central opening 32 in the adjacent end of a rotary drying drum 34.

The central opening 32 of the rotary drying drum 34 in addition to receiving wet pellets from the lower end of the discharge chute 30 of the pelletizing vessel connects with an exhaust conduit 36 which serves as the exhaust port for the gases from within the drying drum.

The description of apparatus to this point comprises a conventional wet process pelletizing system, the same being manually controlled to achieve the correct proportioning of carbon black and water to accomplish the desired agglomeration and pelletizing action. The customary practice of manually controlling the ratio of water and other wetting or surface treating agents which are supplied through the spray port 24, to the flocculent carbon black which is moving through the pelletizing vessel or mixing box comprising the cylindrical housing 2 and the remainder of the apparatus has frequently resulted in inconsistent product quality.

I have observed that pellets of the best quality are obtained only when there is a very small quantity of dust in suspension in the air which is present in the discharge chute 30 of the housing 2. During this time, the pellets are of small diameter and of uniform size distribution. Also, the occurrence of a dust level in chute 30 that is too high indicates the wet carbon black pellets are dusty and high in fines. The absence of dust in chute 30 indicates that the wet carbon black pellets are too wet, too large, and prone to agglomeration and lumping.

According to the teachings of the present invention, the ratio of the flocculent carbon black to water or other wetting agent is controlled and regulated in direct relationship to the dust level occurring and measured from the discharge chute 30.

As shown in FIGURE 1 adjacent the upper end of the discharge chute 30, a port 40 is provided in chute 30 adapted to accommodate one end of a conduit 42 in which there is a fan 44. The other end of the conduit 42 communicates with exhaust conduit 36 of the rotary drying drum 34. This arrangement of conduit 42 enables a slip stream of air and dust to be withdrawn from the chute 30 which is representative of the dust level, hence pellet conditions, within housing 2 and chute 30 thereof.

The controlled operation of the wet process pelletizing operation can be accomplished by monitoring the dust level and using the measured data to control the inputs of material to the pelletizing vessel. Therefore, associated with the conduit 42 is a means for measuring the dust level therein, and accordingly the level in the discharge chute 30 from the housing 2 of the pelletizing vessel. More specifically, a photoelectric light source 50 is disposed to project light rays into the interior of the conduit 42, and immediately opposite said light source is a photoelectric cell 52 for receiving said light rays.

The means for measurement of the dust level within the apparatus of the system is calibrated to control the input to the same in such a manner as to cause the wet pelletizing system to be operated automatically and with uniformity as to product quality. The photoelectric light source 50 is a constant source, so it is only necessary to set the photoelectric cell 52 to respond to the occurrence of a dust level that is either above or below a predetermined range that is known to produce wet pellets of proper quality. The cell 52 therefore generates an output upon the dust in conduit 42 becoming outside of said range.

The output signal from the photoelectric cell 52 is transmitted through electrical conduit 54 to controller 56.

In the illustrated embodiment the controller 56 is adapted to adjust the input of liquid to the housing 2, so the line 25 for supplying pelletizing liquid to the spray port 24 is shown as provided with an electrically operable adjustable valve 58, the same being operated responsively to a signal transmitted through an electrical conduit 60 as actuated by the controller 56 responding to the signal of the measurement means in conduit 42. In the foregoing arrangement, the output signal from the photoelectric cell 52 is received by the controller 56 which controls the flow of water or other wetting agent to the pelletizing vessel by actuating valve 58. The controller is set to respond to a signal generated by a decrease in the intensity of light received by the photoelectric cell 52 by causing an increase in water flow and vice versa. Thus, the concentration of the dust level is maintained within the predetermined range of quality product. In accordance with the foregoing description and teachings, the input control for the feeds of carbon black and liquid to the housing of the pelletizing vessel could be altered from the liquid input to the carbon black input from hopper 23 via chute 22 through opening 20 of housing 2 by applying control valve 58 to the line of transfer from said hopper to the housing. The controller in this instance would increase the carbon black feed input upon the increase in intensity of light being signaled from cell 52 and vice versa.

Operation of a wet process pelletizing system can be accomplished in a more routine manner if that material being input to the system without the use of a controller is maintained at a rather uniform or constant rate, even though the automatic control system is adapted to handle any degrees of input variations between the feeds. It is also comprehended within the invention to employ a controller capable of generating several signals to control several feed inputs simultaneously or to operate with any other desired degree of sophistication suitable for the specific system.

It will be understood that the electrically operable adjustable valve 58 and the instrumentalities for controlling the same are entirely conventional, readily available on the market and as such form no part of the present invention.

Having thus described my invention, what I claim as novel and desire to secure by Letters Patent is:

I claim:

1. Apparatus for pelletizing finely divided solids comprising
    a stationary elongate cylindrical vessel;
    means for introducing an input of finely divided solids into the interior of said vessel;
    means for introducing an input of liquid into the interior of said vessel;
    means within said vessel for the agitation of the mixture of said solid and liquid;
    means for removing from said vessel the pellets of said mixture formed therein together with the dust accompanying the same; and
    means for controlling at least one of said inputs to said vessel in accordance with the dust level in said removing means.

2. The apparatus of claim 1 wherein the means for removing from said vessel the pellets of said mixture formed therein together with the dust accompanying the same comprises a first conduit extending from said vessel; and a second conduit for removing a dust sample slip stream from said first conduit.

3. The apparatus of claim 1 wherein the means for controlling the inputs to said vessel includes a photoelectric light source; a photoelectric cell responsive to said light source; and, a controller actuated by the intensity of said light source directed onto said cell.

4. The apparatus of claim 1 wherein the means for controlling the inputs to said vessel is adapted to control the liquid input to said vessel.

5. The apparatus of claim 1 wherein the means for controlling the inputs to said vessel is adapted to control the solids input to said vessel.

References Cited

UNITED STATES PATENTS

| | | |
|---|---|---|
| 2,394,129 | 2/1946 | West. |
| 2,358,338 | 9/1944 | Lilja et al. |
| 2,883,343 | 4/1959 | Favre et al. |
| 2,917,374 | 12/1959 | Wood _____ 18—1 |
| 3,019,093 | 1/1962 | Gholson _____ 23—314 |
| 3,049,750 | 8/1962 | Austin _____ 18—1 |
| 3,056,162 | 10/1962 | Fisher _____ 18—1 |
| 3,277,218 | 10/1966 | Dollinger _____ 18—1 |

J. HOWARD FLINT, JR., *Primary Examiner.*